(12) United States Patent
Maeda et al.

(10) Patent No.: US 8,188,176 B2
(45) Date of Patent: May 29, 2012

(54) FLUORINE-CONTAINING ELASTOMER

(75) Inventors: Mitsuru Maeda, Ibaraki (JP); Atsushi Miyata, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 24 days.

(21) Appl. No.: 12/812,060

(22) PCT Filed: Nov. 13, 2008

(86) PCT No.: PCT/JP2008/070701
§ 371 (c)(1),
(2), (4) Date: Jul. 8, 2010

(87) PCT Pub. No.: WO2009/087814
PCT Pub. Date: Jul. 16, 2009

(65) Prior Publication Data
US 2010/0286341 A1 Nov. 11, 2010

(30) Foreign Application Priority Data
Jan. 8, 2008 (JP) ................................. 2008-000997

(51) Int. Cl.
*C08F 8/32* (2006.01)
(52) U.S. Cl. ................ 524/430; 525/326.2; 525/326.3; 525/374; 526/247; 526/248
(58) Field of Classification Search ............... 525/326.2, 525/326.3, 374; 526/347, 348
See application file for complete search history.

(56) References Cited

U.S. PATENT DOCUMENTS

| | | | |
|---|---|---|---|
| 4,525,539 A | 6/1985 | Feiring | |
| 5,621,145 A * | 4/1997 | Saito et al. | 564/229 |
| 6,642,300 B1 * | 11/2003 | Kawaguchi et al. | 524/544 |
| 6,803,402 B2 * | 10/2004 | Higashino et al. | 524/430 |
| 7,300,985 B2 * | 11/2007 | Grootaert et al. | 525/326.2 |
| 7,488,781 B2 * | 2/2009 | Xu et al. | 525/326.3 |
| 7,659,347 B2 * | 2/2010 | Washino et al. | 525/326.3 |
| 2001/0047048 A1 * | 11/2001 | Saito | 524/430 |
| 2003/0114599 A1 | 6/2003 | Morimoto et al. | |
| 2006/0235140 A1 * | 10/2006 | Tanaka et al. | 524/544 |
| 2006/0270804 A1 * | 11/2006 | Xu et al. | 525/326.3 |
| 2008/0064820 A1 * | 3/2008 | Kawasaki et al. | 525/326.3 |

FOREIGN PATENT DOCUMENTS

| | | |
|---|---|---|
| JP | 2-59177 | 12/1990 |
| JP | 08-119926 | 5/1996 |
| JP | 09-031284 | 2/1997 |
| JP | 11-303998 | 11/1999 |
| JP | 2003-183402 | 7/2003 |
| JP | 2007-126568 | 5/2007 |

OTHER PUBLICATIONS

International Search Report from corresponding PCT/JP2008/070701 dated Feb. 17, 2009, 4 pages.
International Preliminary Report on Patentability and Written Opinion from corresponding PCT/JP2008/070701 dated Aug. 19, 2010, 7 pages.

* cited by examiner

*Primary Examiner* — Bernard Lipman
(74) *Attorney, Agent, or Firm* — Brinks Hofer Gilson & Lione

(57) ABSTRACT

Disclosed is a fluorine-containing elastomer having a copolymerization composition containing (A) 72.8 to 74.0 mol % of tetrafluoroethylene, (B) 26.8 to 24.0 mol % of perfluoro (lower alkyl vinyl ether) or perfluoro(lower alkoxy-lower alkyl vinyl ether), and (C) 0.2 to 3.0 mol % of a perfluoro unsaturated nitrile compound, and having a Mooney viscosity $ML_{1+10}(121°\ C.)$ of 70 to 115. The fluorine-containing elastomer is compounded with a bisamidoxime compound, which is used as a vulcanizing agent, in an amount of 0.2 to 5 parts by weight based on 100 parts by weight of the fluorine-containing elastomer to form a fluorine-containing elastomer composition. The vulcanizate of the composition, even when used under plasma irradiation conditions or at temperatures as high as 300° C., can prevent weight loss caused by plasma irradiation and exhibits excellent heat resistance at temperatures as high as 300° C. or more.

7 Claims, No Drawings

FLUORINE-CONTAINING ELASTOMER

RELATED APPLICATION

This application is a 35 U.S.C. §371 national phase filing of International Patent Application No. PCT/JP2008/070701, filed Nov. 13, 2008, through which and to which priority is claimed under 35 U.S.C. §119 to Japanese Patent Application No. 2008-000997, filed Jan. 8, 2008.

TECHNICAL FIELD

The present invention relates to a fluorine-containing elastomer. More specifically, the present invention relates to a fluorine-containing elastomer used for plasma irradiation and the like.

BACKGROUND ART

Seals for semiconductor manufacturing devices are applied as surface seals that are used, for example, in process chambers for performing an etching process or for treatments, such as formation of thin films, on the surfaces of silicon wafers, which are semiconductor substrates. The seals are required to have heat resistance, low gas permeability, low dust characteristics (little generation of dust from seals), and other properties. In the etching process of silicon wafers, plasma irradiation is performed under the atmosphere of oxygen or $CF_4$, and therefore the gas (oxygen or halogen) is excited. As a result, the seals for semiconductor manufacturing devices are vulnerable to deterioration; the surfaces of the seals become brittle; and the deteriorated materials and embrittled materials are dispersed and attached to the silicon wafers.

Meanwhile, in semiconductor manufacturing devices, cyano group-containing perfluoroelastomers and the like having excellent heat resistance are used to meet the demand for use of the seals at temperatures as high as 300° C. On the other hand, inorganic fillers, such as silica, barium sulfate, alumina, and aluminum silicate, are added to improve the plasma resistance. Although the addition of such inorganic fillers is effective in preventing the weight loss in the plasma irradiation environment, the presence of elements themselves, such as titanium, barium, aluminum, is undesirable in the semiconductor industry. For this reason, materials containing only silica or no inorganic fillers are preferred.

Moreover, when used for gate valves, the seals are required to be less adhesive, because strong adhesion to metal may cause defects.

As cyano group-containing perfluoroelastomers (fluorine-containing elastomers) having excellent heat resistance and usable in high-temperature environments in semiconductor manufacturing devices, and as vulcanizing agents thereof, those listed below have conventionally been proposed.

Known fluorine-containing elastomers have a copolymerization composition comprising (A) tetrafluoroethylene in an amount of 53 to 79.8 mol %, preferably 64.4 to 72.6 mol %, and more preferably 69.3 mol %; (B) perfluoro(methyl vinyl ether) in an amount of 20 to 45 mol %, preferably 27 to 35 mol %, and more preferably 30 mol %; and (C) a perfluoro unsaturated nitrile compound represented by the general formula:

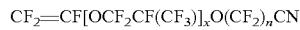

wherein n is 1 to 4, and x is 1 to 2, in an amount of 0.2 to 2 mol %, preferably 0.4 to 1.0 mol %, and more preferably 0.7 mol %. Such fluorine-containing elastomers are supposed to be cured with a bisaminophenol or aromatic tetramine.

Patent Document 1: JP-B-2-59177

The present applicant has proposed vulcanizing this type of fluorine-containing elastomer using a bisamidoxime compound represented by the general formula:

wherein n is 1 to 10, as a vulcanizing agent. Examples of fluorine-containing elastomers usable in this case include those having a copolymerization composition comprising (A) 45 to 75 mol % of tetrafluoroethylene, (B) 54.8 to 20 mol % of perfluoro(lower alkyl vinyl ether) or perfluoro(lower alkoxy-lower alkyl vinyl ether), and (C) 0.2 to 5 mol % of a perfluoro unsaturated nitrile compound. In the examples of Patent Document 2, fluorine-containing elastomers having a copolymerization composition in which the molar ratio of (A):(B):(C) is 63.5:34.9:1.6 or 68.8:30.0:1.2 are used.

Patent Document 2: JP-B-3082626

The present applicant has also proposed vulcanizing this type of fluorine-containing elastomer using a bisamidorazone compound as a vulcanizing agent. Examples of fluorine-containing elastomers usable here include those having a copolymerization composition comprising (A) 45 to 75 mol % of tetrafluoroethylene, (B) 50 to 25 mol % of perfluoro(lower alkyl vinyl ether) or perfluoro(lower alkoxy-lower alkyl vinyl ether), and (C) 0.1 to 5 mol % of a perfluoro unsaturated nitrile compound. In the examples of Patent Document 3, fluorine-containing elastomers having a copolymerization composition in which the molar ratio of (A):(B):(C) is 57.3:39.6:2.8 are used.

Patent Document 3: JP-A-8-119926

The fluorine-containing elastomer disclosed in Patent Document 2 has a cyano group that undergoes a crosslinking reaction with a bisamidoxime compound, which is used as a vulcanizing agent. A fluorine-containing elastomer composition prepared by compounding a vulcanizing agent with the fluorine-containing elastomer has a good processability, such as roll kneadability, and is expected to produce a vulcanization molded product having satisfactory heat resistance and solvent resistance; and the compression set values were measured at 275° C. or 300° C. for 70 hours. In terms of the compression set value at 300° C., however, the fluorine-containing elastomer is not considered to have heat resistance sufficient for use at temperatures as high as 300° C. in semiconductor manufacturing devices.

DISCLOSURE OF THE INVENTION

Problems to be Solved by the Invention

An object of the present invention is to provide a fluorine-containing elastomer having a cyano group as a crosslinkable group, the fluorine-containing elastomer producing a vulcanizate that, even when used under plasma irradiation conditions or at temperatures as high as 300° C., can prevent weight loss caused by plasma irradiation and exhibits excellent heat resistance at temperatures as high as 300° C. or more.

Means for Solving the Problems

The object of the invention can be attained by a fluorine-containing elastomer having a copolymerization composition comprising (A) 72.8 to 74.0 mol % of tetrafluoroethylene, (B) 26.8 to 24.0 mol % of perfluoro(lower alkyl vinyl ether) or perfluoro(lower alkoxy-lower alkyl vinyl ether), and (C) 0.2 to 3.0 mol % of a perfluoro unsaturated nitrile compound. The fluorine-containing elastomer is compounded with a bisamidoxime compound, which is used as a vulcanizing agent, in an amount of 0.2 to 5 parts by weight based on 100 parts by weight of the fluorine-containing elastomer to form a fluorine-containing elastomer composition.

Effect of the Invention

Usable sealing materials for semiconductor manufacturing devices can be formed by vulcanization molding of the fluorine-containing elastomer of the present invention using a bisamidoxime compound as a vulcanizing agent. The obtained sealing materials exhibit excellent heat resistance even without containing inorganic fillers, such as carbon black and silica; and the sealing materials have excellent high temperature heat resistance, which is indicated by compression set values at 300° C. or more, specifically at 300° C. and 315° C. Therefore, the sealing materials such as O rings can retain excellent sealing properties even at temperatures as high as 300° C. or more.

Moreover, since no inorganic fillers are contained, when the sealing materials are used under plasma irradiation conditions, fine particles containing metal elements are not generated, and weight loss caused by the generation of such fine particles is prevented. Thus, the sealing materials are suitably used for semiconductor manufacturing devices. Furthermore, since the sealing materials have excellent non-adhesiveness to stainless steel plates, aluminum plates, and other metal plates, silica glass plates, silicon plates and the like, when they are used for gate valves, which are attached to a region to be exposed to plasma, in a gate portion through which a substrate for forming a semiconductor is transferred from a spare chamber to a process chamber in a vacuum system, the sealing materials are less adhesive to the metals in contact therewith.

BEST MODE FOR CARRYING OUT THE INVENTION

The fluorine-containing elastomer of the present invention has a copolymerization composition comprising (A) 72.8 to 74.0 mol % of tetrafluoroethylene, (B) 26.8 to 24.0 mol % of perfluoro(lower alkyl vinyl ether) or perfluoro(lower alkoxy-lower alkyl vinyl ether), and (C) 0.2 to 3.0 mol % of a perfluoro unsaturated nitrile compound, and has a Mooney viscosity $ML_{1+10}$(121° C.) of 70 to 115. Although the copolymerization ratio is within the general range of copolymerization ratio described in Patent Documents 1 to 3, it is set outside the preferred range of copolymerization ratio, and outside the more preferred range of copolymerization ratio.

The copolymerization ratio of Component (A), i.e., tetrafluoroethylene, is 72.8 to 74.0 mol %, which is close to the upper limits of the ranges described in Patent Documents 1 to 3; particularly, it is set even higher than the upper limit of the preferred range of Patent Document 1. When the copolymerization ratio of Component (A) is lower than this range, the fluorine-containing elastomer is inferior in heat resistance and more adhesive to silicon, metal, silica glass and the like. In the other hand, when the copolymerization ratio is higher than this range, the fluorine-containing elastomer behaves like a resin, rather than an elastomer, resulting in a deterioration of seal performance and inferior processability.

Moreover, the copolymerization ratio of Component (B), i.e., perfluoro(lower alkyl vinyl ether) or perfluoro(lower alkoxy-lower alkyl vinyl ether), is 26.8 to 24.0 mol %, which is lower than the preferred range of copolymerization ratio (27 to 35 mol %) of Patent Document 1, lower than the even more preferred range (30 mol %) of Patent Document 1, and lower than the range (30 mol % or more) used in the examples of Patent Documents 2 and 3. When the copolymerization ratio of Component (B) is lower than this range, the ratio of tetrafluoroethylene in the copolymer relatively increases, and thus the copolymer becomes almost like a resin, as indicated by compression set values at 300° C. and 315° C., leading to a significant deterioration of seal performance. In contrast, when the copolymerization ratio is higher than this range, particularly, the adhesiveness remarkably deteriorates.

As comonomer Component (B), i.e., perfluoro(lower alkyl vinyl ether), generally, perfluoro(methyl vinyl ether), perfluoro(ethyl vinyl ether), perfluoro(propyl vinyl ether), and the like are used. Moreover, as perfluoro(lower alkoxy-lower alkyl vinyl ether), for example, the following compounds are used

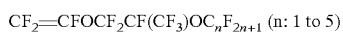

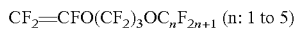

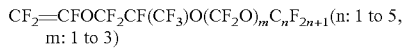

Among these, those in which the $C_nF_{2n+1}$ group is $CF_3$ are particularly preferably used.

Moreover, as comonomer Component (C), i.e., perfluoro unsaturated nitrile compound, which is a crosslinking site monomer, the following compounds are used:

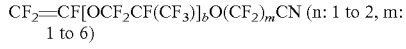

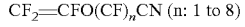

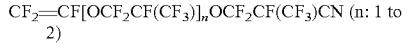

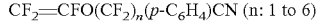

The amount of Component (C) (perfluoro unsaturated nitrile compound) in the copolymer is 0.2 to 3.0 mol %, and preferably 0.5 to 2.0 mol %, which are necessary amounts as a crosslinkable group.

The copolymerization reaction of these monomers is generally carried out as follows. Water, a fluorine-containing emulsifier such as ammonium perfluorooctanoate, and a buffer such as potassium dihydrogen phosphate are charged in a stainless steel autoclave. Then, tetrafluoroethylene, perfluoro(lower alkyl vinyl ether) or perfluoro(lower alkoxy-lower alkyl vinyl ether), and a perfluoro unsaturated nitric compound are added sequentially. After the temperature is raised to about 50 to 80° C., a radical generator such as ammonium persulfate and a reducing agent such as sodium sulfite are added. The reaction pressure is preferably maintained at about 0.75 to 0.85 MPa. Accordingly, in order to increase the reactor internal pressure, which drops with the progress of the reaction, it is preferably to perform the reaction while additionally adding a mixture of these three monomers in several batches.

The terpolymer essentially containing the above-described components can be copolymerized with other fluorinated olefins, various vinyl compounds, etc., in an amount that does not inhibit the copolymerization reaction and does not impair the vulcanizate properties (about 20 mol % or less). Examples of fluorinated olefins include vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, and the like. Examples of vinyl compounds include ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, and the like.

The fluorine-containing elastomer comprising such a terpolymer is compounded with a bisamidoxime compound, which is used as a vulcanizing agent, represented by the general formula:

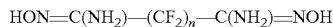

HON=C(NH$_2$)—(CF$_2$)$_n$—C(NH$_2$)=NOH wherein n is 1 to 10, as described in Patent Document 2, in an amount of 0.2 to 5 parts by weight, and preferably 0.5 to 2 parts by weight, based on 100 parts by weight of the fluorine-containing elastomer.

The preparation of a fluorine-containing elastomer composition containing a bisamidoxime compound as a vulcanizing agent is carried out by kneading using two-rolls and the like at about 30 to 60° C. The composition is crosslinked by heating at about 100 to 250° C. for about 1 to 120 minutes. Secondary vulcanization is carried out, if necessary, at about 150 to 280° C. in an inert gas such as nitrogen gas atmosphere, and it is preferable to perform oven vulcanization while gradually raising the temperature, as described in the following examples.

EXAMPLES

The following describes the present invention with reference to examples.

Example 1

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.5 kg of tetrafluoroethylene [TFE], 1.1 kg of perfluoro(methyl vinyl ether) [FMVE], and 130 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.4 kg/hr, 1.0 kg/hr, and 52 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.6 kg of white rubbery terpolymer A was obtained (yield: 89%).

This rubbery terpolymer had a Mooney viscosity ML$_{1+10}$ (121° C.) of 88, and the infrared absorption spectrum and NMR analysis confirmed that the rubbery terpolymer had the following composition:
 TFE: 73.5 mol %
 FMVE: 24.9 mol %
 CEPVE: 1.6 mol %

Example 2

Distilled water (51 kg), 900 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.6 kg of tetrafluoroethylene [TFE], 1.1 kg of perfluoro(methyl vinyl ether) [FMVE], and 100 g of perfluoro(3-oxa-8-cyano-1-octene) [CPeVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CPeVE was divisionally added at a rate of 1.4 kg/hr, 0.9 kg/hr, and 40 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 74 kg of an aqueous latex having a solid matter content of 27 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.0 kg of white rubbery terpolymer B was obtained (yield: 89%).

This rubbery terpolymer had a Mooney viscosity ML$_{1+10}$ (121° C.) of 89, and the infrared absorption spectrum and NMR analysis confirmed that the rubbery terpolymer had the following composition:
 TFE: 73.9 mol %
 FMVE: 24.8 mol %
 CPeVE: 1.3 mol %

Example 3

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.4 kg of tetrafluoroethylene [TFE], 1.2 kg of perfluoro(methyl vinyl ether) [FMVE], and 70 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.3 kg/hr, 1.1 kg/hr, and 30 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.5 kg of white rubbery terpolymer C was obtained (yield: 89%).

This rubbery terpolymer had a Mooney viscosity $ML_{1+10}$ (121° C.) of 84, and the infrared absorption spectrum and NMR analysis confirmed that the rubbery terpolymer had the following composition:
TFE: 73.2 mol %
FMVE: 25.8 mol %
CEPVE: 1.0 mol %

Example 4

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.4 kg of tetrafluoroethylene [TFE], 1.1 kg of perfluoro(methyl vinyl ether) [FMVE], and 130 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.3 kg/hr, 1.1 kg/hr, and 52 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.4 kg of white rubbery terpolymer D was obtained (yield: 89%).

This rubbery terpolymer had a Mooney viscosity $ML_{1+10}$ (121° C.) of 88, and the infrared absorption spectrum and NMR analysis confirmed that the rubbery terpolymer had the following composition:
TFE: 73.3 mol %
FMVE: 25.1 mol %
CEPVE: 1.6 mol %

Example 5

A bisamidoxime compound (n=4; 0.7 parts by weight) was added to 100 parts by weight of Copolymer A (terpolymer of tetrafluoroethylene-perfluoro(methyl vinyl ether)-perfluoro(3,7-dioxa-8-cyano-1-nonene); molar ratio=73.5:24.9:1.6), and the mixture was kneaded on a two-roll mill at a temperature of 40 to 45° C. The kneaded product was subjected to press vulcanization (primary vulcanization) at 180° C. for 30 minutes, and then to oven vulcanization (secondary vulcanization) in a nitrogen gas atmosphere under the following conditions:
at 90° C. for 4 hours,
temperature raised from 90° C. to 204° C. over 6 hours,
at 204° C. for 18 hours,
temperature raised from 204° C. to 288° C. over 6 hours, and
at 288° C. for 18 hours.

Example 6

In Example 5, Copolymer B (terpolymer of tetrafluoroethylene-perfluoro(methyl Vinyl ether)-perfluoro(3-oxa-8-cyano-1-octene); molar ratio=73.9:24.8:1.3) was used in place of Copolymer A Example 7

In Example 5, Copolymer C (terpolymer of tetrafluoroethylene-perfluoro(ethyl vinyl ether)-perfluoro(3,7-dioxa-8-cyano-1-nonene); molar ratio=73.2:258:1.0; Mooney viscosity $ML_{1+10}$(121° C.): 84) was used in place of Copolymer A.

Example 8

In Example 5, Copolymer D (terpolymer of tetrafluoroethylene-perfluoro(methoxyethyl vinyl ether)-perfluoro(3,7-dioxa-8-cyano-1-nonene); molar ratio=73.3:25.1:1.6; Mooney viscosity $ML_{1+10}$(121° C.): 88) was used in place of Copolymer A.

As for the obtained terpolymers, each of the following items was measured.
Normal state physical properties: DIN53505 (hardness) DIN53503 (tensile testing)
Compression set: ASTM Method B; measured using a P-24 O ring at 300° C. or 315° C. for 70 hours
Plasma irradiation test (weight loss rate): using RBH-3030 produced by Ulvac
$O_2$ plasma
RF output: 1500 W
Irradiation time: 6 hours
Degree of vacuum: 0.1 Torr
Adhesion test: A P-24 O ring was sandwiched between two 5×5 cm stainless steel plates (SUS plates), aluminum plates, silica glass plates, or silicon plates, and compressed by 15%, followed by heating at 80° C. for 15 hours and then cooling at a room temperature for 30 minutes, then the maximum load when the two plates were pulled at a rate of 100 mm/min. was measured Comparative Example 1

In Example 5, a terpolymer of TFE-FMVE-CEPVE (Copolymer E; copolymerization monomer molar ratio=68.5:29.9:1.6; Mooney viscosity $ML_{1+10}$(121° C.):82) was used in place of Copolymer A, and vulcanization and measurement were carried out in the same manner as described above. Copolymer E was synthesized as follows.

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.4 kg of tetrafluoroethylene [TFE], 1.4 kg of perfluoro(methyl vinyl ether) [FMVE], and 130 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.0 kg/hr, 1.4 kg/hr, and 52 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.2 kg of white rubbery terpolymer E was obtained (yield: 87%).

Comparative Example 2

In Example 5, a terpolymer of TFE-FMVE-CEPVE (Copolymer F; copolymerization monomer molar ratio=77.5:21.1:1.4; Mooney viscosity $ML_{1+10}(121°C.)$: 91) was used in place of Copolymer A, and vulcanization and measurement were carried out in the same manner as described above. Copolymer F was synthesized as follows.

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.6 kg of tetrafluoroethylene [TFE], 1.1 kg of perfluoro(methyl vinyl ether) [FMVE], and 100 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.6 kg/hr, 0.7 kg/hr, and 40 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.5 kg of white rubbery terpolymer F was obtained (yield: 93%).

Comparative Example 3

In Example 5, a terpolymer of TFE-FMVE-CEPVE (Copolymer G; copolymerization monomer molar ratio=69.9:28.8:1.3; Mooney viscosity $ML_{1+10}(121°C.)$ 85) was used in place of Copolymer A, and vulcanization and measurement were carried out in the same manner as described above. Copolymer G was synthesized as follows.

Distilled water (55 kg), 1800 g of ammonium perfluorooctanoate, and 782 g of potassium dihydrogen phosphate were charged in a stainless steel autoclave having an inner volume of 100 L, and the air in the autoclave was replaced by nitrogen, followed by pressure reduction. Then, 1.4 kg of tetrafluoroethylene [TFE], 1.4 kg of perfluoro(methyl vinyl ether) [FMVE], and 100 g of perfluoro(3,7-dioxa-8-cyano-1-nonene) [CEPVE] were sequentially charged thereto, and the temperature was increased to 60° C. An aqueous solution (5 L) in which 70 g of ammonium persulfate and 12 g of sodium sulfite were dissolved was added thereto, starting the polymerization reaction.

During the polymerization reaction, each of TFE, FMVE, and CEPVE was divisionally added at a rate of 1.1 kg/hr, 1.3 kg/hr, and 40 g/hr, respectively, while the pressure in the autoclave was maintained at 0.78 to 0.83 MPa. The divisional addition of each monomer were stopped 7 hours after the initiation of the polymerization reaction, and the same condition was maintained for another one hour. After the autoclave was cooled, the residual gas was purged, thereby obtaining 76 kg of an aqueous latex having a solid matter content of 26 wt. %. The obtained aqueous latex was added to a mixed solution of 80 L of a 5 wt. % magnesium chloride aqueous solution and 80 L of ethanol for coagulation, followed by washing with water and drying at 80° C. for 70 hours. Thus, 17.4 kg of white rubbery terpolymer G was obtained (yield: 88%).

The results obtained in the above examples and comparative examples are show in the table below.

TABLE

| Measurement item | | Ex. 5 | Ex. 6 | Ex. 7 | Ex. 8 | Comp. Ex. 1 | Comp. Ex. 2 | Comp. Ex. 3 |
|---|---|---|---|---|---|---|---|---|
| Hardness | (Shore-A) | 83 | 85 | 82 | 80 | 69 | 88 | 71 |
| Tensile testing | | | | | | | | |
| 100% modulus | (MPa) | 7.1 | 7.7 | 6.4 | 6.5 | 2.4 | 9.2 | 2.6 |
| Breaking strength | (MPa) | 18.3 | 18.5 | 18.7 | 17.2 | 21.8 | 19.3 | 20.8 |
| Elongation at break | (%) | 200 | 200 | 210 | 180 | 240 | 140 | 240 |
| Compression set | | | | | | | | |
| 300° C., 70 hrs | (%) | 20 | 19 | 21 | 21 | 18 | 46 | 19 |
| 315° C., 70 hrs | (%) | 26 | 30 | 34 | 28 | 60 | 68 | 55 |
| Plasma testing | | | | | | | | |
| Weight loss rate | (%) | 40 | 39 | 40 | 42 | 48 | 35 | 52 |
| Adhesion test | | | | | | | | |
| SUS plate | (N) | 92 | 95 | 97 | 94 | 127 | 88 | 130 |
| Al plate | (N) | 101 | 98 | 99 | 105 | 107 | 101 | 118 |
| Silica glass plate | (N) | 62 | 60 | 65 | 61 | 91 | 55 | 90 |
| Silicon plate | (N) | 32 | 35 | 38 | 36 | 62 | 30 | 80 |

INDUSTRIAL APPLICABILITY

A sealing material obtained by vulcanization molding of a composition comprising the fluorine-containing elastomer of the present invention and a bisamidoxime compound is used for plasma irradiation, for example, for semiconductor manufacturing devices. Additionally, the sealing material is effectively used as a surface seal of a process chamber for treating a surfaces of silicon wafers; for example, the sealing material is effectively used an O ring, packing, etc., which are applied to the connecting surface between two chambers or the bonding surface between a chamber and a gate (door) so as to maintain vacuum conditions.

The invention claimed is:

1. A fluorine-containing elastomer composition comprising:
    a fluorine-containing elastomer having a copolymerization composition comprising (A) 72.8 to 74.0 mol % of tetrafluoroethylene, (B) 26.8 to 24.0 mol % of perfluoro (lower alkyl vinyl ether) or perfluoro(lower alkoxy-lower alkyl vinyl ether), and (C) 0.2 to 3.0 mol % of a perfluoro unsaturated nitrile compound; and
    a bisamidoxime compound in an amount of 0.2 to 5 parts by weight based on 100 parts by weight of the fluorine-containing elastomer;
    the composition being free of inorganic fillers.

2. The fluorine-containing elastomer according to claim 1, wherein the fluorine-containing elastomer has a Mooney viscosity $ML_{1-10}$ (121° C.) of 70 to 115.

3. A sealing material obtained by vulcanization molding of the fluorine-containing elastomer of claim 1.

4. The sealing material according to claim 3, which is used for plasma irradiation.

5. The sealing material according to claim 4, which is used for a semiconductor manufacturing device.

6. The sealing material according to claim 5, which is used as a surface seal of a process chamber for treating a surface of a silicon wafer.

7. The sealing materials according to claim 4, which is used for a gate valve.

* * * * *